United States Patent [19]

Loftin et al.

[11] Patent Number: 4,992,502
[45] Date of Patent: Feb. 12, 1991

[54] SOLID CORRECTION COMPOSITIONS

[75] Inventors: Rachel M. Loftin, Halifax; John Thompson, Medfield, both of Mass.

[73] Assignee: The Gillette Company, Boston, Mass.

[21] Appl. No.: 393,615

[22] Filed: Aug. 14, 1989

[51] Int. Cl.$^5$ .................. C08K 3/22; C08L 31/04; C08L 91/06; C08L 91/08
[52] U.S. Cl. ................... 524/277; 524/275; 524/488; 524/489; 523/161
[58] Field of Search ............. 524/277, 487, 488, 489, 524/413, 275; 523/161

[56] References Cited

U.S. PATENT DOCUMENTS

| | | | |
|---|---|---|---|
| 3,321,427 | 5/1967 | Tyran | 524/277 |
| 3,461,092 | 8/1969 | Story | 524/277 |
| 3,933,708 | 1/1976 | Brinkman | 523/164 |
| 4,371,634 | 2/1981 | Hoffman et al. | 524/277 |
| 4,654,081 | 5/1987 | Dalzell | 524/161 |
| 4,883,379 | 11/1989 | Fukuda et al. | 428/428.1 |

FOREIGN PATENT DOCUMENTS

| | | | |
|---|---|---|---|
| 2049429 | 3/1971 | France | 523/164 |
| 49-51326 | 5/1974 | Japan | 523/164 |
| 63-199777 | 8/1988 | Japan . | |

*Primary Examiner*—Allan M. Lieberman
*Attorney, Agent, or Firm*—John P. Morley

[57] ABSTRACT

Solid correction compositions useful in the form of a stick for correcting markings. The compositions include an opacifying pigment dispersed in a solid mixture of selected first and second waxes and a compatible film forming polymeric hardening material. The stick is rubbed over the marking to be corrected to deposit an adherent film which obscures the marking and can receive and retain a corrected marking.

11 Claims, No Drawings

SOLID CORRECTION COMPOSITIONS

BACKGROUND OF THE INVENTION

1. Part 1 The Field of the Invention

This invention relates to solid correction compositions which are applied to a marking to form a film over the marking which can effectively obscure the marking and receive and retain a corrected marking.

2. Part 2. Description of the Prior Art

Solid correction compositions are known and have been proposed as replacements for liquid correction fluid compositions in correcting markings. Solid correction compositions present obvious advantages over liquid correction fluids since there is no need to wait for evaporation of liquid components or any need to use volatile organic fluids in the compositions. Solid correction compositions are disclosed and described in Japanese Patent Applications 61-11610 and 62-33142. Correction compositions disclosed in Japanese Patent application 61-11610 comprise solid dispersions of opacifying pigment (titanium dioxide) in combination with an ester wax, a vinyl chloride copolymer, drying oils (linseed and tung oils) and a plasticizer (vinyl butyl phthalate and water epoxy). Japanese Patent Application 62-33142 discloses correction compositions comprising a solid dispersion of titanium dioxide in combination with a wax and an ethylene-vinyl acetate copolymer.

The performance characteristics of the solid correction compositions of the Japanese Patent Applications have been found to be deficient in certain important aspects. For example, one of the most important performance characteristics assigned a liquid or solid correction composition is the capability of the composition to form a film over a marking to be corrected which can both effectively obscure the marking and provide a dry bonded film which can receive and retain a new marking. In the case of the solid correction composition of Japanese Patent Application 61-11610 the film applied to the marking remains moist because of a relatively slow rate of evaporation of the included drying oil and, the covering power of the film was weak. Also, the evaporation of the drying oil from the solid correction composition ultimately renders the composition unusable. On the other hand, films produced by the solid correction compositions of Japanese Patent Application 62-33142 were found to have poor adhesion and bonding to the paper. Accordingly, there remains an outstanding need in the art for solid correction compositions which can continually and reliably provide a solid film on application to a marking which can both effectively obscure the marking and receive a corrected marking. This invention is addressed to that need and provides an extremely effective response to that need.

BRIEF SUMMARY OF THE INVENTION

The present invention presents to the art novel improved solid correction compositions having an extremely desirable combination of performance characteristics. Solid correction compositions of the present invention have a hardness value (ASTM D-1321) of less than about 10 and preferably between about 4-7 The compositions are used in the form of a stick which can be applied to a marking to be corrected by rubbing the stick over the marking to form an adherent film which can effectively obscure the marking and can also receive and retain a corrected marking. Essential ingredients of correction compositions of the present invention comprise an opacifying pigment dispersed in a solid mixture of a specific combination of selected waxes and a compatible film forming polymer. Additional ingredients which may be included in solid correction compositions of the present invention to provide or enhance selected performance characteristics of the compositions are tackifying resins or polymers, selected lanolins, polymerically entrapped or microencapsulated fluids or ingredients to provide films having surface characteristics which can receive and retain markings of both aqueous based and organic solvent based marking compositions.

DETAILED DESCRIPTION OF THE PREFERRED EMBODIMENTS

The solid correction compositions of the present invention include an opacifying pigment dispersed in a specific combination of selected waxes and selected polymeric materials which cooperate to provide a composition having properties of opacity, adhesion, tackiness and spreadability which form films especially effective for use in correcting markings. The films formed by the solid correction composition of the invention can both effectively obscure and cover a marking to be corrected and receive and retain a written or typed corrected marking.

Titanium dioxide is the preferred opacifying pigment for use in correction compositions of the present invention. Suitable titanium dioxide pigments include commercially available rutile and anatase titanium dioxide or mixtures of these which preferably have an average particle size between about 0.2 to about 0.4 microns and an average oil absorption of about 14 lbs oil/100 lbs pigment to about 36 lbs oil/100 lbs pigment. The amount of titanium dioxide included in the composition can vary depending primarily on the degree of coverage desired. Amounts of titanium dioxide between about 30 to about 70 percent by weight of the total composition weight are normally suitable, but amounts between about 45 to about 60 percent by weight are especially preferred. Other opacifying pigments may be used alone but preferably are used in combination with the titanium dioxide. Such other pigments include zinc sulfide, zinc oxide and basic lead carbonate or sulfate. Colored pigments or dyes may also be used for matching the color of the correction composition to the color of the paper to which the solid correction composition is applied.

The combination of waxes used in correction compositions of the invention include a first wax having a melting point between 60° C. to about 90° C. and which is flexible and relatively soft and/or has a degree of tackiness which promotes adhesion of the composition to paper. Preferred first waxes are microcrystalline waxes which consist mainly of isoparaffins and naphthenes with small amounts of aromatic hydrocarbons. Microcrystalline waxes suitable in compositions of the present invention have molecular weights between about 480 to about 800 and low to high adhesion or laminating strength at low temperatures and low to high flexibility at low temperatures. Preferred microcrystalline waxes have molecular weights between about 550 to about 700 and viscosities between about 50 to about 100 S.U.S. at 210° F. Natural and synthetic beeswaxes are also suitable as first waxes since they provide performance characteristics substantially similar to those provided by the microcrystalline waxes preferred amounts of first wax(es) included in the solid correction compositions range between about 5 to about 15 percent by weight, first wax(es) based on the total weight of the composition.

The second wax used in combination with the first wax has a low melting point (between about 40° C. to about 50° C.) and a relatively high hardness value (ASTM D-1321) between about 5 to about 10. The lower melting points of the second wax provide ease of processing, while the high hardness value improves the quality of markings applied to the film. Preferred second waxes are waxes of cetyl esters, and especially those which are commonly referred to as synthetic spermaceti waxes. Preferred amounts of the second wax are between about 5 to about 15 percent by weight. The ratio of the first to second wax may range between about 0.25:1 to about 1:1.25 and the preferred ratio of the first to the second wax is between about 0.5:1 to about 0.75:1.

Film forming polymers used in combination with the first and second waxes are selected to impart hardness, toughness, bondability and flexibility to the films applied to the markings since the waxes alone do not provide films suitable for receiving markings from pens or a typewriter. Preferred film forming polymers have melting points between about 70° C. to about 110° C. Additionally, the polymers are compatible with the waxes to the extent that they can be melted at the melting temperatures of the waxes and form solutions with the melted waxes. Ethylene vinyl acetate copolymers having a melting point between about 80° C. to 90° C. and a Shore A-2 Durometer hardness value (ASTM D-2240) of between about 40 to about 80 are especially preferred in the practice of the invention. Ethylene acrylic acid copolymers and linear polymeric alcohols having melting points between about 80° C. to about 100° C. and hardness values (ASTM D-1321) of between about 1 to about 15 are also suitable. Suitable commercially available polymers are the UNILIN alcohols sold by the Petrolite Corporation, which are primary linear polymeric alcohols with the formula $CH_3(CH_2)_xCH_2OH$ with an average molecular weight from about 425 to 700 and an approximate molecular weight distribution of about 1.09. The film forming polymers are preferably used in amounts between about 2 to about 15 percent by weight.

Preferred solid correction compositions also include additional tackifying polymers such as polyisobutylenes having average molecular weights between about 800 to about 40,000 and aliphatic petroleum hydrocarbon resins having melting points between about 90° C. to about 100° C. The tackiness or adhesive properties of correction compositions of the invention are considered to be important features of compositions of the invention. It is believed that the compositions provide films which comprise separate layers of the composition which are bonded to the paper on each application or rubbing of the composition on the paper. Because the separate layers of the film are firmly bonded to each other and to the paper surfaces, the film provides the coverage needed to obscure the marking and has the toughness and durability to receive and retain a written or typed corrected marking.

Other ingredients which may be included in solid correction compositions of the present invention include selected synthetic lanolins and products in which fluid materials are entrapped by or encapsulated in polymeric materials. The addition of lanolins to compositions of the present invention permit higher opacifying pigment loadings and also provide compositions having better rubbing characteristics and improved tackiness and adhesion. Preferred lanolins are synthetic lanolins sold by Huls America Incorporated under the trade names SOFTISAN 645 and 649 which are believed to be adipic/isostearic triglyceride and caprylic/capric/isostearic adipic triglyceride respectively. The preferred amounts of lanolin used in the compositions range between about 3 to 10 percent by weight based on the total composition weight.

Products in which lubricating fluids are entrapped or microencapsulated in frangible polymeric materials have the capability to dispense the fluids in response to the application of pressure to rupture or break the polymeric materials. Products in which lubricating fluids are entrapped by polymeric materials include fluids such as cyclomethicone or mineral oils entrapped in acrylate copolymers. Such materials are sold by Wickhen Products Incorporated under the trade names POLYTRAP or CUSTOM POLYTRAP. Microencapsulated lubricating fluid products include fluids such as methylcyclohexane microencapsulated in frangible polymeric beads. The trapped or encapsulated fluids are released by rubbing the correction stick composition against the paper surface including the marking to rupture the entrapping or encapsulating polymeric material. On release, the fluids have a lubricating effect which makes the stick glide easily over the paper while the residue of entrapping or encapsulating polymeric material imparts firmness to the film for better writeover properties. Suitable amounts of products providing entrapped or encapsulated liquids are in a range between about 1 to about 10 and preferably between about 1 to about 5 percent by weight of the total weight of the stick composition.

Other ingredients which improve application of the solid composition to a marking include myristyl myristate, stearyl heptanoate, cocoa butter (both natural and synthetic), all of which are solids at room temperature but become liquids at temperatures of about 37° C. Suitable amounts of the above ingredients are between about 1 to about 7 percent by weight. Metal soaps and boron nitride in amounts between about 1 to about 6 percent by weight are useful as dry lubricants for improving application of the solid compositions to markings. Additionally, ingredients to adjust the color or shine of the solid stick composition such as talcum, diatomaceous earth and silica in amounts between about 1 to about 5 percent by weight can be employed. Further, ingredients such as sodium lauryl sulfate may be employed to adjust the surface energy of the film to decrease resistance to aqueous based inks.

Additional details of the invention as well as manners of practising the invention will be more fully understood and appreciated by reference to the following illustrative, non-limiting Examples. The solid correction compositions prepared in the following Examples 1-7 were prepared according to the following procedure:

1. Warm up a hot plate for 15 minutes at medium high setting.
2. Place all non-powder materials in a one-quarter pint metal beaker.
3. Cover and place the beaker on hot plate for 12 minutes.
4. Remove from heat and stir thoroughly.

5. Add powder materials to beaker and stir thoroughly for about one minute.
6. Cover beaker and heat on hot plate for one minute.
7. Stir mixture thoroughly until pour point is obtained.
8. Pour mixture into appropriate mold shaped in the form of a stick.
9. Allow mixture to cool to room temperature before removing sticks from the mold.

Solid correction stick compositions may also be made by an extrusion method. In this method, all ingredients are combined in a commercial blender to provide a powdery material which can be fed to an extruder heated to between about 100° C. to about 125° C. The melted material is fed to a mold to shape the material into a stick-like shape.

Example 1

The following solid correction stick compositions was prepared:

| Ingredient | Gms. | % by Wt. |
|---|---|---|
| Linear Polymeric alcohol[1] | 2.0 | 6.2 |
| Ethylene vinyl acetate copolymer[2] | 2.0 | 6.2 |
| Plastic Microcrystalline wax[3] | 2.5 | 7.1 |
| Cetyl esters wax | 4.0 | 12.4 |
| Diatomaceous earth[4] | 2.0 | 6.2 |
| Sodium lauryl sulfate | 1.5 | 4.6 |
| Polyisobutylene[5] | 0.5 | 1.5 |
| Polymeric entrapped fluid[6] | 1.0 | 3.1 |
| Titanium dioxide[7] | 17.0 | 52.3 |

[1]Sold under the trade name UNILIN 550 by Petrolite Corp.
[2]Sold under the trade name ELVAX 210 by E. I. DuPont de Nemours & Co.
[3]Sold under the trade name Bowax 800 by Boler Petroleum Co.
[4]Sold under the trade name CELITE 512 by Johns Mansville Co.
[5]Sold under the trade name OPPANOL B10 by BASF Corp.
[6]Sold under the trade name CUSTOM POLYTRAP 0035 by Wickhen Corp.
[7]Sold under the trade name TI-PURE R.901 by E. I. DuPont de Nemours & Co.

Example 2

The following correction stick composition was prepared:

| Ingredient | Gms. | % by Wt. |
|---|---|---|
| Linear polymeric alcohol[1] | 2.0 | 6.5 |
| Plastic microcrystalline wax[3] | 2.0 | 6.5 |
| Cetyl esters wax | 4.0 | 13.0 |
| Diatomaceous earth[4] | 0.5 | 1.6 |
| Sodium lauryl sulfate | 0.5 | 1.6 |
| Petroleum hydrocarbon resin[8] | 0.5 | 1.6 |
| Myristyl myristate[9] | 2.0 | 6.5 |
| Synthetic lanolin[10] | 1.0 | 3.3 |
| Synthetic lanolin[11] | 1.0 | 3.3 |
| Titanium dioxide[7] | 17.5 | 56.4 |

[8]Sold under the trade name ESCOREZ 1102 by Exxon Corp.
[9]Sold under the trade name CRODAMOL MM by Croda Corp.
[10]Sold under the trade name SOFTISAN 645 by Huls America Inc.
[11]Sold under the trade name SOFTISAN 649 by Huls America Inc.

Example 3

The following solid correction stick composition was prepared:

| Ingredient | Gms. | % by Wt. |
|---|---|---|
| Linear polymeric alcohol[1] | 2.0 | 5.9 |
| Ethylene vinyl acetate copolymer[2] | 1.0 | 2.9 |
| Plastic microcrystalline wax[3] | 2.0 | 5.9 |
| Cetyl esters wax | 4.0 | 11.8 |
| Diatomaceous earth[4] | 1.5 | 4.4 |
| Sodium lauryl sulfate | 1.5 | 4.4 |
| Polyisobutylene[5] | 1.5 | 4.4 |
| Microencapsulated fluid[12] | 3.5 | 10.3 |
| Titanium dioxide[7] | 17.0 | 50.0 |

[12]Methylcyclohexane encapsulated in a core of a polymeric bead having an average particle size of about 50 microns and where the weight of encapsulated methylcyclohexane is about 75 percent of the total weight of the polymeric bead.

Example 4

The following solid correction stick composition was prepared:

| Ingredient | Gms. | % by Wt. |
|---|---|---|
| Linear polymeric alcohol[1] | 1.0 | 3.4 |
| Ethylene acrylic acid copolymer[13] | 3.0 | 10.2 |
| Plastic microcrystalline wax[3] | 3.0 | 10.2 |
| Cetyl esters wax | 3.0 | 10.2 |
| Diatomeceous earth[4] | 0.5 | 1.7 |
| Sodium lauryl sulfate | 1.0 | 3.4 |
| Synthetic lanolin[10] | 1.0 | 3.4 |
| Synthetic lanolin[11] | 1.0 | 3.4 |
| Titanium dioxide[7a] | 15.5 | 53.4 |

[13]Sold under the trade name AC POLYETHYLENE 580 by Allied Corp.

Example 5

The following solid correction stick composition was prepared:

| Ingredient | Gms. | % by Wt. |
|---|---|---|
| Linear polymeric alcohol[1] | 2.0 | 6.1 |
| Ethylene vinyl acetate copolymer[2] | 2.0 | 6.1 |
| Plastic microcrystalline wax[14] | 2.0 | 6.1 |
| Cetyl esters wax | 4.0 | 12.2 |
| Sodium lauryl sulfate | 1.5 | 4.5 |
| Synthetic lanolin[10] | 2.5 | 7.6 |
| Magnesium stearate | 1.5 | 4.5 |
| Boron nitride | 0.5 | 1.5 |
| Titanium dioxide[15] | 2.0 | 6.1 |
| Titanium dioxide[7] | 15.0 | 45.0 |

[14]Sold under the trade name BE SQUARE 175 by Bareco
[15]Sold under the trade name RFC-6 by Tioxide Co.

Example 6

The following solid correction stick composition was prepared:

| Ingredient | Gms. | % by Wt. |
|---|---|---|
| Linear polymeric alcohol[16] | 2.5 | 10.0 |
| Ethylene vinyl acetate copolymer[2] | 1.0 | 4.0 |
| Beeswax[17] | 2.0 | 8.0 |
| Cetyl Esters wax | 3.0 | 12.0 |
| Sodium lauryl sulfate | 0.5 | 2.0 |
| Polyisobutylene[18] | 1.5 | 6.0 |

-continued

| Ingredient | Gms. | % by Wt. |
|---|---|---|
| Titanium dioxide[7] | 14.5 | 58.0 |

[16]Sold under the trade name UNILIN 425 by Petrolite Corp.
[17]Sold under the trade name YELLOW WAX by Ruger Chemical Co.
[18]Sold under the trade name OPPANOL B3 by BASF Corp.

Example 7

The following solid correction stick composition was prepared:

| Ingredient | Gms. | % by Wt. |
|---|---|---|
| Linear polymeric alcohol[1] | 2.0 | 6.3 |
| Ethylene vinyl acetate copolymer[2] | 2.0 | 6.3 |
| Microcrystalline wax[19] | 2.0 | 6.3 |
| Cetyl esters wax | 4.0 | 12.6 |
| Synthetic lanolin[10] | 3.0 | 9.5 |
| Magnesium stearate | 1.5 | 4.8 |
| Titanium dioxide[7a] | 2.5 | 7.9 |
| Titanium dioxide[14] | 14.5 | 46.0 |

[19]Sold under the trade name BOWAX 1018 by Boler Petroleum Co.

Each of the solid correction compositions of Examples 1–7 provided correction sticks having an attractive combination of desirable performance characteristics. The correction sticks were applied to written and typewritten markings on paper by lightly rubbing the sticks over the marking and surrounding paper surface. As the stick was rubbed over the marking, the composition was easily deposited on and bonded to the paper surface to provide a pigmented film which covered and obscured the marking. The deposited film was substantially dry and written or typewritten corrected markings could be immediately applied to the film surface. Moreover, high quality corrected written or typewritten markings were provided on the film by aqueous based, partially aqueous based or organic solvent based inks. The compositions of Examples 1, 2, 4, 6 and 7 were found to have an especially desirable combination of performance characteristics particularly in terms of the quality of coverage of the film and the receptivity of the film to corrected markings.

We claim:

1. A solid correction composition comprising from about 30 to about 70 percent by weight of the total composition weight of an opacifying pigment substantially uniformly dispersed in a mixture of ingredients including from about 5 to about 15 percent by weight of a first wax having a melting point between about 60° C. to about 90° C. in combination with from about 5 to about 15 percent by weight of a second wax having a melting point between about 40° C. to about 50° C. and where the ratio of the first wax to the second wax is from about 0.25:1 to about 1:1.25 and, from about 2 to about 10 percent by weight of a film forming polymer having a melting point between about 65° C. to about 120° C. and which is sufficiently compatible with the waxes so that the polymer can be melted with the waxes to form a solution with the melted waxes, said correction composition having a hardness value of about 10 or less.

2. A composition of claim 1 where the hardness value is about 5 or less.

3. A composition of claim 2 where the polymer is an ethylene vinyl acetate polymer, an ethylene acrylic acid polymer, a linear polymeric alcohol or mixtures of these.

4. A composition of claim 3 where the first wax is a microcrystalline wax, beeswax or mixtures of these.

5. A composition of claim 4 where the ratio of the first wax to the second wax is about 0.5:1 to about 0.75:1.

6. A composition of claim 5 where the second wax is a synthetic spermaceti, a wax of cetyl esters or mixtures of these.

7. A composition of claim 1 further including from about 1 to about 10 percent by weight of a low molecular weight tackifying resin.

8. A composition of claim 7 where the tackifying resin is a polyisobutylene having a molecular weight between about 800 to about 40,000, a low melting petroleum hydrocarbon polymer or mixtures of these.

9. A composition of claim 1 further including from about 2 to about 10 percent by weight of a synthetic lanolin.

10. A composition of claim 1 further including from about 1 to about 10 percent by weight of a material comprising a lubricating fluid entrapped in or encapsulated by a polymeric material.

11. A composition of claim 1 where the opacifying pigment comprises from about 45 to about 60 percent by weight titanium dioxide.

* * * * *